United States Patent Office 3,283,148
Patented Nov. 1, 1966

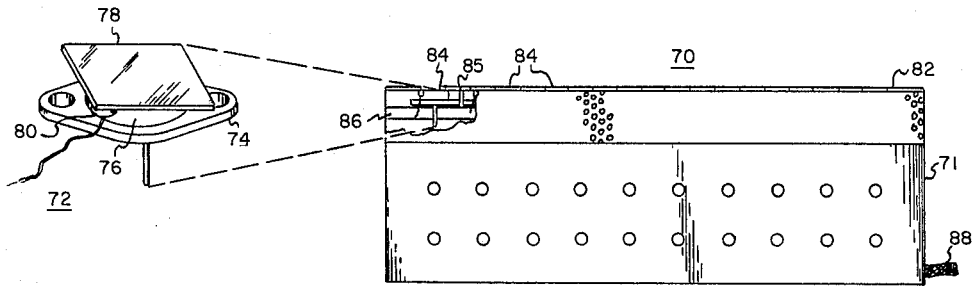
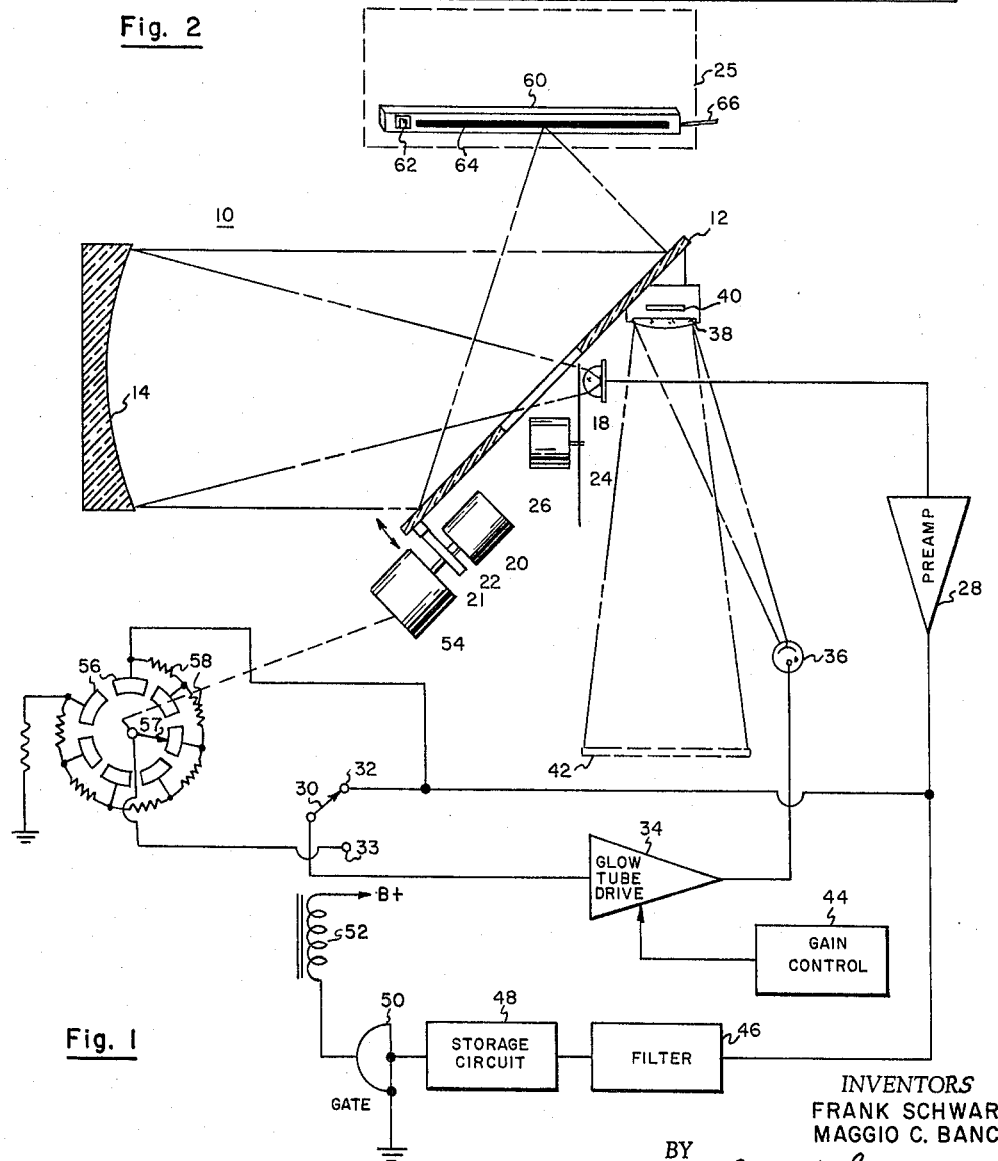
Fig. 2
Fig. 1
INVENTORS
FRANK SCHWARZ
MAGGIO C. BANCA
BY
Joseph Levinson
ATTORNEY

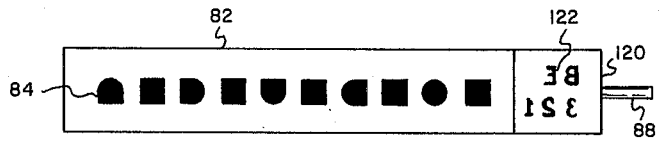
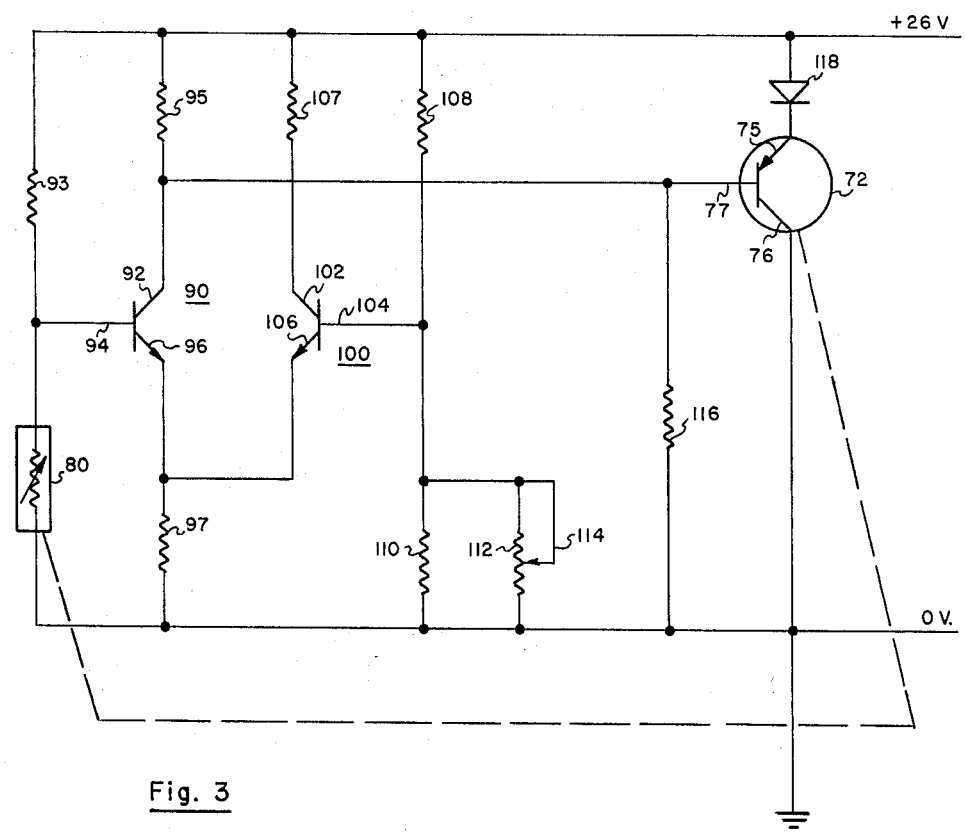
Fig. 4
Fig. 3
INVENTORS
FRANK SCHWARZ
MAGGIO C. BANCA
BY Joseph Levinson
ATTORNEY

3,283,148
INFRARED IMAGE SYSTEM WITH A PLURALITY OF INFRARED RADIATION EMITTING REFERENCE SOURCES POSITIONED NEAR THE OBJECT
Frank Schwarz, Stamford, and Maggio C. Banca, Old Greenwich, Conn., assignors to Barnes Engineering Company, Stamford, Conn., a corporation of Delaware
Continuation of application Ser. No. 272,477, Apr. 11, 1963. This application Apr. 1, 1966, Ser. No. 539,583
9 Claims. (Cl. 250—65)

This invention relates to a calibrator for a thermograph (infrared camera), and more particularly to a gray scale calibration means for determining the various gradations of gray in a thermogram produced by a thermograph, so that the temperatures of the various objects reproduced by the thermograph may be readily determined. The calibrator may at the same time provide a means of identification of the thermogram taken by the thermograph.

In Patent 2,895,049 entitled Image Transducer by R. W. Astheimer et al., an infrared camera, referred to herein as a thermograph, is provided which is sensitive to long wave infrared energy. This energy, or radiation, which is received from a field of view of the thermograph, is utilized to produce a thermal image hereinafter referred to as a thermogram, in which the grayness of the picture is a prescribed function of the infrared radiance of the objects in the field of view of the thermograph. In order to properly interpret the thermogram which has been produced by the thermograph, each thermogram must provide accurate identification of various gradations of gray representing predetermined temperatures in the field of view. This has been provided in the aforesaid patent in the form of an artificial internal gray scale which is comprised of a gray scale generator which produces a plurality of discrete levels of current utilized to modulate a light source to display the artificial gray scale. The current generated by the artificial gray scale was completely independent of the detector utilized in the thermograph for picking up radiation from the field of view. Accordingly, the same gray scale would appear on the thermogram regardless of the system gain, sensitivity, focus, or other instrument settings which would make interpretation of the thermogram more on the order of approximations than accurate calibrations. An infinitely more useful means of calibration would be one which utilizes the complete system which would factor in the quality of focusing, the settings and over-all performance of the instrument as well as environmental conditions in the field of view.

It is an object of the present invention to provide an improved calibration means for an infrared image system.

A further object of this invention is to provide an improved thermograph which utilizes an external gray scale means in combination therewith, which provides a more accurate calibration for a thermogram.

Another object of this invention is to provide an improved thermograph having a calibration means which factors in system sensitivity, optical settings, gain adjustments, and general over-all performance of the thermograph for more accurately identifying each gray scale level in terms of the temperature it represents in a thermogram produced by the improved thermograph.

The thermograph of the aforesaid patent utilizes a black body reference source at ambient temperature. When the ambient temperature varies greatly, it is difficult to make approximations of the temperatures of the various objects in the thermogram. A thermostated black body reference source would help under changing ambient conditions but would not compensate for instrument settings, dirt on the optics, etc. when using an internal gray scale when it is viewed by the detector of the thermograph. Furthermore, with an internal gray scale approximations are all that are obtainable whether an ambient black body reference source or a thermostated black body reference source is used.

It is a further object of this invention to provide an improved thermograph which provides a more accurate temperature calibration source while using an ambient temperature black body reference.

Still another object of this invention is to provide an improved thermograph which provides more accurate temperature calibration without using an internal thermostated black body reference source.

Another object of this invention is to provide an external calibration means which may also be adapted for identification of the thermogram.

In carrying out this invention, an external gray scale calibration means is positioned in the field of view of a thermograph. The calibration means presents to the thermograph the equivalents of a plurality of different temperatures in a predetermined range in the field of view, which is recorded on the thermogram in the form of gradations of gray, which may be used to interpret the thermogram. Any inconsistencies due to settings of the thermograph, sensitivity, optical focus, dirt on the optics, etc., are compensated for by utilizing the external gray scale. The calibration means may also be provided with characters of high emissivity which are either punched out of or mounted on a background of low emissivity material to provide a means of identifying a thermogram.

The invention, both as to organization and method of operation, together with further objects and advantages thereof, may best be understood by reference to the following description taken in connection with the accompanying drawings, in which:

FIG. 1 is a schematic diagram of the improved thermograph using one form of external gray scale calibration means in combination therewith, as embodied in this invention, FIG. 2 is an elevational view, partly broken away, of another form of external gray scale showing in exploded detail one controlled calibrated reference source which may be utilized with the present invention, FIG. 3 is an electrical schematic diagram of a circuit for maintaining a constant temperature of the reference source of the type shown in FIG. 2, and FIG. 4 is a top view of an external gray scale calibrator adapted with identification means.

Several approaches are possible in providing an external gray scale calibration means for a thermograph. The external gray scale means may comprise a plurality of individully temperature-controlled reference sources, each at a different temperature, over a predetermined temperature range. Another form which the external gray scale calibration means could take is a single temperature-controlled reference source which represents the highest temperature of the thermograph temperature range, and providing electronic attenuation of this source to represent the remaining steps of the temperature range. Another approach would be to provide a single reference source whose temperature is the highest of the range to be seen by the thermograph, with the lower temperature steps being provided through the use of attenuation of the radiation from the single source using neutral density filters. The temperature range which the gray scale is to cover, and the use of the thermograph for specific applications, will determine the type of external gray scale calibration means which will be most suitable under the prevailing operating conditions.

Referring now to FIG. 1, there is shown a single reference source which is progressively attenuated to represent the desired temperature range. The thermograph or infrared camera is referred to generally with the reference character 10, and includes a plane scanning mirror 12, a parabolic mirror 14, and an infrared detector 18 which may be of the thermistor bolometer type. This particular optical arrangement is merely illustrative, and other optics such as, for example, a Cassagrain system may be used. A motor 20 driving a cam 22 drives the mirror 12 in the direction shown by the arrows. This drive mechanism scans successive points to trace a horizontal line in the field of view represented by dash lines 25. Means are also provided (not shown) for indexing the mirror 12 vertically so that successive parallel lines are scanned along the entire field of view to form a raster thereof. One form of arrangement for achieving the scanning of a field of view is shown and described in the aforesaid patent and forms no part of this invention. Infrared radiation coming from the field of view 25 is reflected by mirror 12 onto the parabolic mirror 14 which converges such radiation on the detector 18. A chopper 24 is interposed between the parabolic mirror 14 and the detector 18 and is driven by a chopper motor 26. The chopper 24 facing the detector is blackened to provide an ambient temperature reference source. The chopper 24 functions to provide a detector output of alternating voltage whose amplitude is proportional to the difference between the intensity of the radiation from the point being scanned in the field of view 25 and the intensity of the radiation of the blackened back of the chopper blade. Since an external gray scale of known temperature is utilized in accordance with this invention, a thermostated black body reference source is not necessary in order to calibrate the temperatures in the field of view. Such a source might be required when using the internal gray scale as disclosed in the aforesaid patent when the ambient temperature varies over a wide range. If a thermostated black body reference source is desired, the back of the chopper blade facing the detector would be mirrored. By blackening the back of the chopper blade 24 as is preferable in this invention, a simpler ambient reference source is provided. If desired, however, a thermostated black body may be used in combination with the external gray scale as disclosed herein which may be desirable in cases where the ambient temperature approaches the temperature of the objects to be thermographed.

The output of the detector 18 is amplified by a pre-amplifier 28 and applied by a switch 30, via a switch contact 32 and a glow tube driver stage 34 to a glow tube 36. The glow tube 36 emits a beam of light whose intensity is proportional to its electrical input onto a plane mirror 40. The mirror 40 is securely mounted to the plane mirror 12, such that the scanning movements of mirror 12 provide the same scanning motion for the mirror 40. The light coming from the glow tube 36 is reflected by the mirror 40, and converged by a lens 38 on a photographic plate or film 42. A gain control 44 may be provided which is connected to the glow tube driver 34 for controlling the contrast range of the thermograph 10.

One form of external gray scale calibration means which may be utilized with the thermograph 10 is shown in FIG. 1. An external gray scale means 60 includes a marker source or conventional lamp 62, a calibration source 64, and a source of 60-cycle power supplied through conductor 66. The calibration reference source 64 is a high-emissivity black-body source, often a copper plate in contact with a heating element imbedded in any suitable thermal conducting material, such as conducting plastic, rubber, etc. The front plate is coated with a radiating surface of blackening material, such as Zapon or other suitable black paint, to provide a high emissivity surface. The black-body plate is heated by suitable means such as heating coils, whose temperature is controlled by a controller such as a silicon control rectifier, thyratron, etc.

Upon completion of the scanning of a portion of the target area 25, the thermograph begins scanning the external gray scale source 60, and first receives radiation from the lamp 62. The lamp 62 generates a sufficient amount of pulsed heat from its filament to be separated by a 60-cycle filter 46, which is connected to the preamplifier 28 of the thermograph 10. The output of the 60-cycle filter 46 is rectified and stored on a capacitor in a storage circuit 48, which holds its charge for a duration greater than the time of one scan line. The direct current output from the storage circuit 48 is used to actuate a gate 50, which energizes a relay coil 52 for moving the switch 30 from contact 32 to a contact 33. When the switch 30 is connected to contact 33, an attenuator 54 is connected between the output of the pre-amplifier 28 and the input of the glow tube drive stage 34, to selectively provide correct attenuation for each step representing desired equivalent values of temperature. The attenuator 54 comprises a rotary switch 57 which is mounted on the horizontal cam drive shaft 21 which moves the switch 57 as a horizontal line is scanned in the field of view. The switch 57 moves on a plurality of commutators 56 which connect a plurality of resistors 58 selectively in the circuit. As a horizontal line is scanned, more resistance from resistors 58 is switched into the circuit to provide greater attenuation.

The attenuation required for each reference step will depend on the temperature range desired to be calibrated, and the sensitivity of the detector over the spectral region in which the target radiates. Assuming that the detector has uniform sensitivity over the entire spectral region in which the target radiates, the target radiance received by the detector follows the Fourth Power law in which $w = \epsilon \sigma T^4$, where $w$=total radiant flux emitted per unit area, $\epsilon$=emissivity factor, $\sigma$=Stefan-Boltzman constant, and $T$=absolute temperature of radiating body. As an example, in a range from 80° to 100° F., which would be the range untilized when making thermograms of the human body for medical diagnosis, the change in radiance with temperature can be asumed to be linear for a radiance of 100° F. A change of 2° F. results in a variation of 1.3% in the radiance value, and accordingly the detector output voltage, which is proportional to the radiance of the target, must be attenuated 1.3% when moving the scan from the 100° source to the next attenuated step, representing 98° F. The following steps would also produce an additional 1.3% attenuation on down until the last step, which would provide a gain of about 88% of the initial value for 100° F. Should a detector be used with a less linear wavelength response, the above attenuation steps would have to be altered. In FIG. 1 only six steps are shown for ease of illustration, and more steps may be added by increasing the attenuation by the addition of more resistance.

A number of variations for implementing the aforesaid system may be used. For example, the relay-actuated switch 30 might be replaced with a manual switch which would be operated by the thermograph operator whenever he wishes to scan across the external gray scale 60. This would eliminate the need for the sources 62, filter 46, storage circuit 48, gate 50, and relay 52. Furthermore, solid state switches may be utilized to provide the attenuation in place of a rotary switch, as well as to substitute for the mechanical relay.

The external gray scale calibration means 60, as shown in FIG. 1, could be modified by varying the radiance in steps instead of using resistance attenuation. For example, the external gray scale 60 may be provided with punched openings in an aluminum front plate of the calibrator enclosure, which are covered with optical materials, to attenuate the radiance from the single extended reference source 64. The openings would be cut-outs of various shapes to identify the temperature equivalent radiance through each opening, and a filter having the desired attenuation characteristics would be provided for covering such openings. A variety of filters may be utilized for achieving the desired attenuation. For example, thin sheets of polyethylene could be utilized, which offers excellent transmission characteristics to beyond 30 microns. While a system of this type is the simplest and least expensive, it will lead to errors due to variations in ambient temperature. Among other types of filters that might be utilized would be a partially but homogeneously aluminized high transmission substrate, or a transmitting substrate on which is placed a fine-mesh grid structure. The energy the detector receives is either transmitted, emitted, or reflected from the surface of the filter, and accordingly, some error will be associated with each of the filters which may be selected, since the emitted and reflected radiation depend on the ambient temperature. These errors will be small and acceptable when the equivalent temperatures of the field of view of the thermograph are considerably higher than the ambient temperature, and the attenuation required is not too great.

Another form which the external gray scale calibration means may take is shown on FIG. 2. In this form, the external gray scale is comprised of a plurality of independent, controlled black body sources, each adjusted and regulated at a predetermined temperature. An external gray scale means 70 is provided with a case 71, having an aluminum top 82 with a plurality of different shaped openings 84 therein. Mounted on a phenolic board 86 within the case 71 are a plurality of power transistors 72 having a support 74, which are mounted on the board 86, a flat circular collector terminal 76, and a copper plate 78. The copper plate 78 is secured to the flat circular collector terminal 76 using a cement which provides a good electrical contact and at the same time good thermal conduction between the plate 78 and the terminal 76. The plates 78 are the targets for the thermograph. The copper plate 78, as well as the brass case 76 of the power transistor 72, provide good thermal conductivity, and assure an isothermal target for the thermograph. The power transistors are separated by a metallic fin 85 for thermally isolating the units. The low emissivity aluminum top 82 has a plurality of different shaped openings 84 therein, thereby exposing the plate 78 in various shapes to the thermograph, so that the different temperatures may be readily identified (see FIG. 4). Each power transistor 72 is provided with a thermistor 80, which is cemented, using conductive cement, to the plate 78. The thermistor 80 is mounted to a corner of the copper plate 78, whose temperature is to be controlled. The surface of the copper plate 78 to be scanned is provided with a black coating to provide high emissivity and a good black body source. A source of potential is applied to the unit through a power cord 88.

The circuitry for controlling the temperature of the various copper plates is shown in FIG. 3. Each of the power transistors 72 is provided with a similar circuit which is set to control the temperature of the copper plates associated with each power transistor at a different predetermined temperature designed to cover the operating range of the temperatures in the filed of view of the thermograph for a particular application. The circuit includes transistors 90 and 100, having base electrodes 94, 104, collector electrodes 92, 102, and emitter electrodes 96, 106, respectively. The emitter electrodes 96 and 106 are connected through a resistor 97 to a source of reference potential. Collector electrodes 92 and 102 are connected through resistors 95 and 107, respectively, to a source of positive potential. The base electrode 94 of transistor 90 is connected between a resistor 93 and thermistor 80, which forms one leg of a Wheatstone bridge, and the base electrode 104 of transistor 100 is connected between a resistor 108 and parallel resistors 110 and 112 having a variable tap 114 thereon, which form another leg of the Wheatstone bridge. The power transistor 72 is provided with an emitter electrode 75, a base electrode 77, and a collector electrode 76 which is connected to ground. The base electrode 77 is connected through a biasing resistor 116 to a source of reference potential, and also to the collector electrode 92 of transistor 90. The emitter electrode is connected through a diode 118 to a source of positive potential.

In operation, when power is provided to the external gray scale means 70, the thermistor 80 is assumed to have a higher resistance than the value that it will assume when the bridge is balanced because it will then be at a higher temperature. As a result of the high value of resistance of thermistor 80 which provides an unbalance of the Wheatstone bridge, transistor 90 is forward biased and begins conducting. The conduction of transistor 90 produces a greater base current, which brings down its collector potential, which is directly coupled to the power transistor 72. Since the power transistor 72 is a PNP transistor, it is forward biased whenever its base potential drops from its cut-off level to a lower value. The lower potential on the base 77 of power transistor 72 produces greater emitter and collector current flow in power transistor 72, producing a higher power dissipation which raises the temperature of the power transistor as well as the conductive plate 78 which is secured thereto. The temperature of the power transistor 72 and the plate 78 continues to rise until the thermistor 80 which is mounted in the plate 78 reaches a resistance value which provides a balance of the Wheatstone bridge. Current through the transistor 72 then reaches a static value representing the dissipation required to keep the plate 78 at the temperature to which the source is set. If the heating momentarily exceeds the value desired, transistors 90 and 72 cut off, and the lower surrounding air temperature will cool off the power transistor 72 until equilibrium is again reached. Transistor 72 may be cut off because of voltage drop produced by the diode 118 connected to the collector electrode of the transistor 72. The diode 118 provides a slight reverse emitter base bias which allows the transistor 72 to cut off when there is little or no current flow in transistor 90. The diode 118 also protects the power transistor 72 in the event that the power supply leads are inadvertently reversed. The adjustable resistor 112 serves to set the Wheatstone bridge balance to the desired operating point, so that each of the sources may be adjusted to a different value and, further, the temperature range of the gray scale may be changed by varying resistor 112. If desired, the resistor 112 may be replaced by a plurality of resistors which may be switched in to change the temperature range of the gray scale. Transistor 100 complements transistor 90 to produce a differential output when the variable resistance of thermistor 80 of the bridge arm forming the bias network for the base of transistor 90 does not correspond to the two fixed arms of the bridge which bias transistor 100. The differential amplifier also serves to maintain good balance of the D.C. Wheatstone bridge and the amplifier system over a wide range of ambient temperatures.

It should be understood that it is not necessary to use power transistors as the active sources. For example, thermostated heating coils might be utilized to warm the copper plates to produce the desired effect. Similarly, for certain applications it may not be necessary to use ten separate independently controlled sources. For example, one or more sources may be independently temperature controlled, but may be attenuated in a predetermined sequence to achieve the desired result.

The external gray scale calibrator may be adapted for performing the additional function of providing a means for readily identifying a thermogram which is taken by the thermograph. FIG. 4 illustrates one way of producing such a result. The top 82 of the calibrator is provided with a removable stencil or plate 120 of low emissivity material such as aluminum, in which a plurality of characters, such as letters or numbers 122, or any desired combination thereof, are punched out to expose a black body source of high emissivity. The black body source need not be accurately thermostated, but is preferably heated to a temperature which would correspond to a temperature on the upper end of the temperature range of the calibrator. This would produce white letters and/or numbers on a dark background so that a particular thermogram could be readily identified. The letters are reversed on the plate 120 due to the optical system which will reverse them on the thermogram. It will be appreciated that a black body source is not essential, nor does the punched-out plate 120 need to be made of low emissivity material. All that is needed is that more or less radiation is provided through the holes in the plate 120 than from the plate 120 and that the difference in radiation from these sources is sufficient enough to be recorded on the thermogram.

Another way of accomplishing the above result would be to provide a solid plate 120 of low emissivity material which is heated and has affixed thereto letters and/or numbers of high emissivity material.

In providing an external gray scale calibrator which provides an active source for the thermograph and is positioned in the field of view of the thermograph, temperature errors which might occur due to optical setting, dust on the optics, gain control circuitry, etc., are automatically compensated for, such that an accurate means is provided for calibrating the various temperatures appearing on the thermograms produced by the thermograph. The external gray scale provides an accurate record of the temperature range of the thermograph, and may be used to calibrate or interpret the thermogram produced by the thermograph. Also, when different settings are provided for increasing the range or contrast on the thermograph, the external gray scale source being positioned in the field of view will automatically calibrate the temperature range for the change in settings of the thermograph instrument.

Since other modifications, varied to fit particular operating requirements and environments, will be apparent to those skilled in the art, the invention is not considered limited to the examples chosen for purposes of disclosure, and covers all changes and modifications which do not constitute departures from the true spirit and scope of this invention.

What we claim as new and desire to secure by Letters Patent is:

1. A thermal infrared image system for temperature measurement comprising, in combination,
    (a) an infrared camera for providing a thermal image in the form of a thermogram in accordance with infrared radiation received by the camera from an object in its field of view,
    (b) a gray scale means positioned externally from and in the field of view of said camera and near said object whereby a thermal image of said gray scale means is recorded on said thermogram adjacent said thermal image of the object,
    (c) said gray scale means having a plurality of infrared radiation emitting reference sources of different known temperatures in a predetermined temperature range whereby a gray scale representing gradations of gray in accordance with infrared radiation received by said camera from said sources appears on said thermogram,
    (d) said plurality of reference sources being contained in a unitary structure and spatially separated therein, and
    (e) said unitary structure of said gray scale means including infrared radiation emitting identification means for said thermograms.

2. The thermal infrared image system as set forth in claim 1 wherein said identification means comprises characters of high emissivity materials positioned on a background of low emissivity material.

3. The thermal infrared image system as set forth in claim 1 wherein said identification means comprises characters punched through a low emissivity material to expose a black body source of high emissivity.

4. A thermal infrared image system for temperature measurement of an object or objects in its field of view comprising in combination
    (a) an infrared detector,
    (b) optical means for focusing a field of view on said infrared detector,
    (c) scanning means for scanning said infrared detector over a predetermined field of view, thereby applying radiation from successive points in said predetermined field of view to said infrared detector, to produce signals from said infrared detector in accordance with the received radiation,
    (d) means for converting the signals produced by said infrared detector into visual form thereby providing a visual display of the predetermined field of view of said infrared detector,
    (e) a gray scale means positioned externally from said infrared detector, said scanning means and said optical means and in the field of view of said infrared detector near the object or objects whose temperature is to be measured by the thermal image system whereby a thermal image of said gray scale means is displayed on said visual display adjacent the thermal image of the object or objects whose temperature is to be measured,
    (f) said gray scale means having a plurality of infrared radiation emitting reference sources of different known temperatures in a predetermined temperature range whereby a gray scale representing gradations of gray in accordance with infrared radiation received by said infrared detector from said infrared radiation emitting reference sources appears as a thermal image adjacent the thermal image of the object or objects on said visual display.

5. The thermal infrared image system as set forth in claim 4 wherein said plurality of infrared radiation emitting reference sources are housed in a unitary structure and spatially separated therein.

6. The thermal image system as set forth in claim 5 wherein said infrared radiation emitting reference sources are mounted in said unitary structure behind a plurality of different shaped openings in a material of lower emissivity than said infrared radiation emitting reference sources whereby different scale temperatures may be readily recognized on said visual display.

7. The thermal image system as set forth in claim 4 wherein said infrared radiation emitting reference sources are each comprised of a plate of high emissivity material, means for heating said plate, and means for controlling said plate at a predetermined temperature.

8. The thermal image system as set forth in claim 7 wherein said means for heating said plate is a power transistor in which the collector terminal of said power transistor has said plate attached thereto for good thermal conductivity therebetween, and electrical means for providing conduction in said power transisitor to heat said collector terminal and said plate.

9. The thermal image system as set forth in claim 8 wherein said means for controlling said plate at a predetermined temperature comprises a thermistor attached to said plate and connected in circuit with said electrical means for controlling the conduction of said power transistor.

References Cited by the Examiner

UNITED STATES PATENTS

| 2,747,103 | 5/1956 | Fairbank et al. | 250—65 |
| 2,798,962 | 7/1957 | Wormser | 250—83.3 |
| 2,895,049 | 7/1959 | Astheimer et al. | 250—65 |
| 2,902,602 | 9/1959 | Chassende-Baroz | 250—65 |
| 2,995,973 | 8/1961 | Barnes et al. | 250—83.3 |
| 3,077,539 | 2/1963 | Blau et al. | 250—85 |

RALPH G. NILSON, *Primary Examiner.*

W. F. LINDQUIST, *Assistant Examiner.*